(12) United States Patent
Hwang

(10) Patent No.: US 6,478,518 B1
(45) Date of Patent: Nov. 12, 2002

(54) BARREL NUT

(76) Inventor: Sunny Hwang, 20427 Corsair Blvd., Hayward, CA (US) 94545

( * ) Notice: Subject to any disclaimer, the term of this patent is extended or adjusted under 35 U.S.C. 154(b) by 0 days.

(21) Appl. No.: 10/061,135

(22) Filed: Jan. 31, 2002

(51) Int. Cl.$^7$ .............................. F16B 37/00; F16B 37/12
(52) U.S. Cl. ........................ 411/104; 411/178; 411/427
(58) Field of Search .............................. 411/104, 178, 411/386, 427

(56) References Cited

U.S. PATENT DOCUMENTS

| | | |
|---|---|---|
| 3,574,367 A | 4/1971 | Jankowski |
| 4,405,253 A | 9/1983 | Stockum |
| 4,639,161 A | 1/1987 | Mazaki |
| 5,500,963 A | 3/1996 | Yeh |
| 6,126,355 A | 10/2000 | Clover, Jr. |
| 6,148,569 A | 11/2000 | Giovannetti |
| 6,257,796 B1 | 7/2001 | Salice |

FOREIGN PATENT DOCUMENTS

| | | | | |
|---|---|---|---|---|
| FR | 412433 | * | 7/1910 | ................. 411/386 |
| GB | 694040 | * | 7/1953 | ................. 411/104 |

* cited by examiner

Primary Examiner—Neill Wilson
(74) Attorney, Agent, or Firm—Jack Lo

(57) ABSTRACT

A barrel nut for securing furniture panels is comprised of a cylindrical body with an external thread extending between its opposite ends. The cylindrical body is arranged for being positioned in a snug fitting hole in a furniture panel. A transverse hole is positioned completely through the cylindrical body and has an internal thread extending between its opposite ends. The transverse hole is arranged for receiving a bolt extending from an adjacent furniture panel. A tool socket is arranged at an outer end of the cylindrical body for receiving a turning tool which can screw the cylindrical body into the snug fitting hole. An alignment mark aligned with the transverse hole is provided on the outer end of the cylindrical body to indicate the position of the transverse hole for facilitating alignment with the bolt.

2 Claims, 2 Drawing Sheets

BARREL NUT

BACKGROUND OF THE INVENTION

1. Field of the Invention

This invention relates generally to threaded fasteners.

2. Prior Art

Most furniture are designed to be shipped in a disassembled condition, and are provided with fasteners for assembly by the end user. Wood furniture cannot simply be connected by bolts screwed into wood because the wood can easily fracture around the screws. Therefore, special nuts known as barrel nuts that are recessed into the wood are used for securing the bolts. A typical barrel nut is loosely positioned in a hole in a furniture panel, and a transverse bolt extending from an adjacent panel is screwed into the nut. Since the nut is loosely positioned in its hole, aligning it with the bolt is very difficult.

Other types of furniture fasteners are also known. They are generally complicated in construction and require specialized manufacturing techniques to make and install at the factory. Some of them require precise alignment with one or more pieces of furniture panels, so that if they are even slightly misaligned when installed at the factory, they will make assembling the furniture very difficult for the end user.

BRIEF SUMMARY OF THE INVENTION

The objects of the present barrel nut are:

- to be recessed in a piece of furniture panel;
- to be securely positioned in a snug fitting hole;
- to receive a transverse bolt extending from an adjacent furniture panel;
- to be easily aligned with the bolt;
- to be simple in construction; and
- to be simple to use for an untrained end user.

Figure 1:
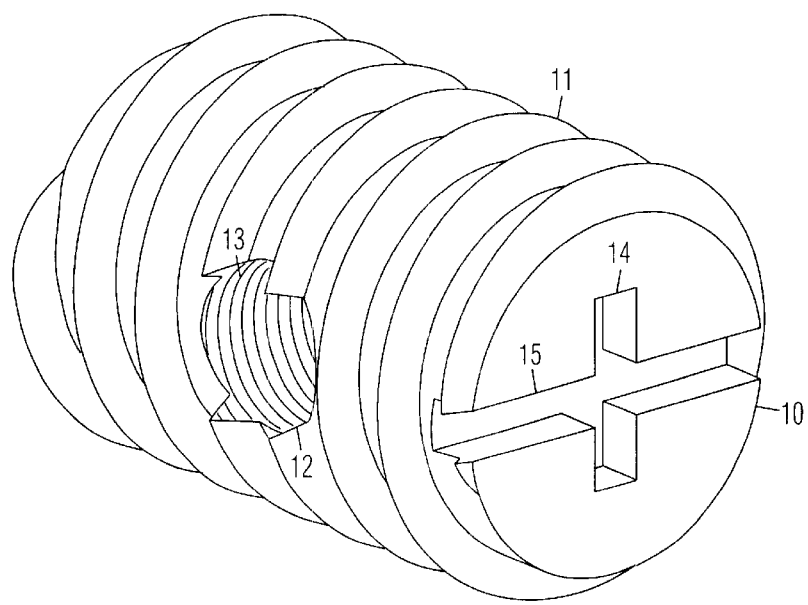
FIG. 1 is an end perspective view of the present barrel nut.
Figure 2:
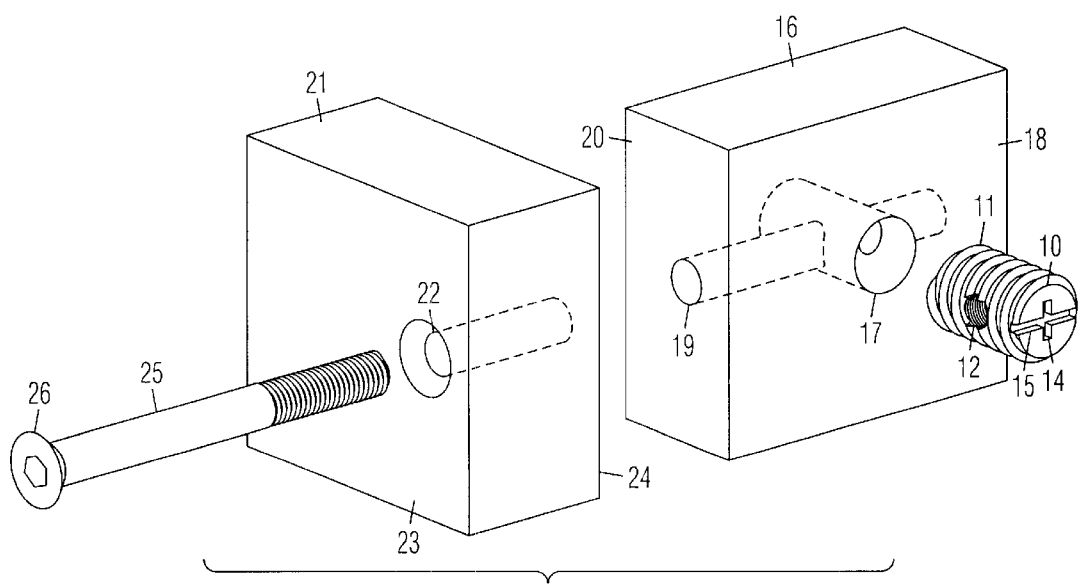
FIG. 2 is an exploded view of the barrel nut and furniture panels prior to assembly.

A barrel nut for securing furniture panels is comprised of a cylindrical body with an external thread extending between its opposite ends. The cylindrical body is arranged for being positioned in a snug fitting hole in a furniture panel. A transverse hole is positioned completely through the cylindrical body and has an internal thread extending between its opposite ends. The transverse hole is arranged for receiving a bolt extending from an adjacent furniture panel. A tool socket is arranged at an outer end of the cylindrical body for receiving a turning tool which can screw the cylindrical body into the snug fitting hole. An alignment mark aligned with the transverse hole is provided on the outer end of the cylindrical body to indicate the position of the transverse hole for facilitating alignment with the bolt.

DRAWING REFERENCE NUMERALS

10. Cylindrical Body
11. External Thread
12. Transverse Hole
13. Internal Thread
14. Tool Mating Portion
15. Alignment Mark
16. First Panel
17. First Hole
18. Side of Panel
19. Second Hole
20. Edge of Panel
21. Second Panel
22. Third Hole
23. Side of Panel
24. Side of Panel
25. Threaded Fastener
26. Head

DETAILED DESCRIPTION OF THE INVENTION

FIG. 1:

A preferred embodiment of the present barrel nut is shown in an end perspective view in FIG. 1. It is comprised of a cylindrical body 10 with an external thread 11 extending between its opposite ends. A transverse hole 12 orthogonal to the axis of cylindrical body 10 is positioned completely through cylindrical body 10, and has an internal thread 13 extending fully between its opposite ends. A tool mating portion 14 is arranged at an outer end of cylindrical body 10 for receiving a turning tool (not shown). Tool mating portion 14 may be comprised of a cross-shaped "PHILLIPS" screw driver slots as shown for receiving a "PHILLIPS" screw driver. One of the slots is preferably comprised of a long alignment mark 15 which extends across a diameter of cylindrical body 10 and aligned with transverse hole 12 to indicate the position of transverse hole 12. Alternatively, tool mating portion 14 may be a socket of another shape for mating with other types of tools, or it may be a protruding head such as a hexagonal head for mating with a wrench or socket tool.

FIGS. 2–4:

Exemplar furniture panels arranged to be joined include a first panel 16 with a first hole 17 extending into first panel 16 from a first side 18. First hole 17 is slightly smaller than the outside diameter of thread 11 on cylindrical body 10. A second hole 19 extending into first panel 16 from an edge 20 intersects first hole 17 perpendicularly through its axis. A second panel 21 includes a third hole 22 fully extending between its opposite sides 23 and 24.

Figure 3:
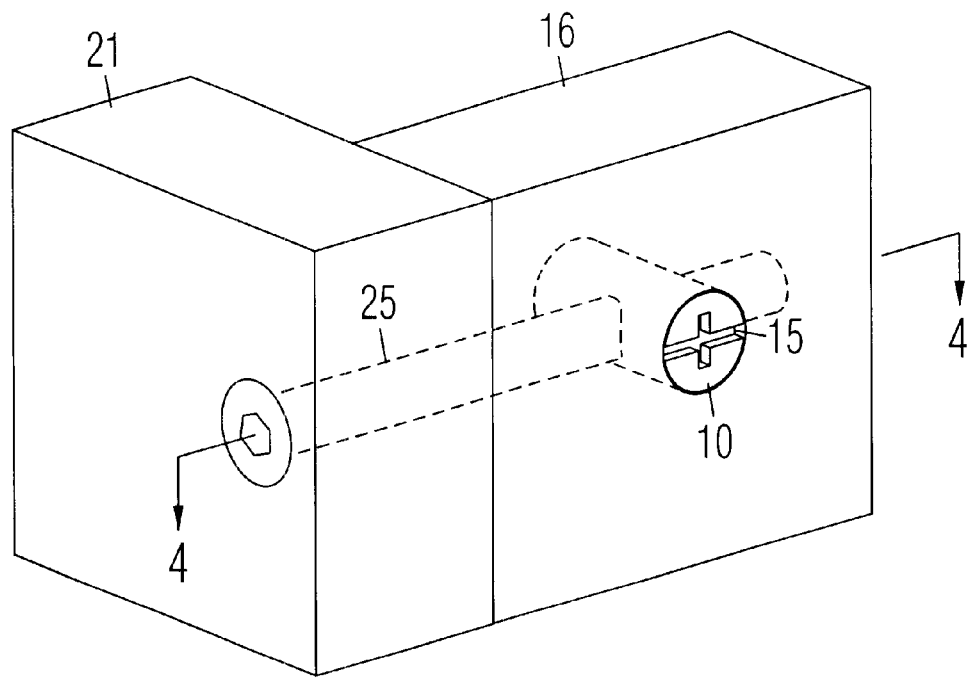
FIG. 3 is a perspective view of the barrel nut and the furniture panels when assembled.
Figure 4:
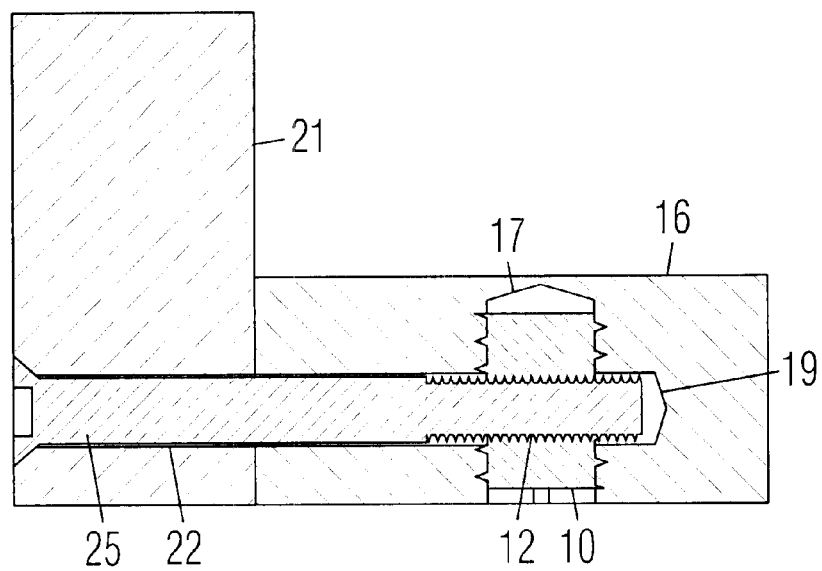
FIG. 4 is a sectional view of the barrel nut and the furniture panels when assembled, taken along line 4—4 in FIG. 3.

Cylindrical body 10 is sized for being snugly positioned in first hole 17 in first panel 16. A turning tool is used to screw cylindrical body 10 into first hole 17 until the outer end of cylindrical body 10 is flush with the surface of side 18, and alignment mark 15 is aligned with second hole 19. A threaded fastener 25 is inserted into third hole 22 in second panel 21, and the end of threaded fastener 25 is inserted into second hole 19 in first panel 16 until it contacts cylindrical body 10. Threaded fastener 25 may be a bolt or a screw. Since cylindrical body 10 fits snugly in first hole 17, it remains stationary for bolt 17 to be easily aligned with transverse hole 12. A turning tool (not shown) is used to turn threaded fastener 25 into transverse hole 12 in cylindrical body 10 until a head 26 on threaded fastener 25 is tightly engaged against second panel 21. The assembled furniture panels are shown in a perspective view FIG. 3 and a sectional view in FIG. 4.

Accordingly, the present barrel nut is easy to install and is easy to aligned with the bolt, so that it allows an untrained end user to easily assemble furniture panels. It is also extremely simple in construction and therefore economical to produce.

Although the foregoing description is specific, it should not be considered as a limitation on the scope of the invention, but only as an example of the preferred embodiment. Many variations are possible within the teachings of the invention. Therefore, the scope of the invention should be determined by the appended claims and their legal equivalents, not by the examples given.

I claim:

1. A barrel nut, comprising:

an externally threaded cylindrical body for being positioned in a first hole in a panel;

a tool mating portion at an outer end of said cylindrical body for mating with a turning tool for being turned into said first hole in said panel;

an internally threaded transverse hole extending orthogonally through said cylindrical body, wherein said transverse hole is arranged for receiving a threaded fastener positioned in a second hole orthogonally intersecting said first hole in said panel; and an alignment mark on said outer end of said cylindrical body aligned with said transverse hole for indicating positioning of said transverse hole relative to said threaded fastener.

2. A barrel nut assembly, comprising:

a first panel;

a first hole in said first panel;

a second hole in said first panel orthogonally intersecting said first hole;

a second panel positioned against said first panel;

a third hole in said second panel aligned with said second hole in said first panel;

an externally threaded cylindrical body positioned in said first hole in said first panel;

a tool mating portion arranged at an outer end of said cylindrical body for mating with a turning tool for being turned into said first hole in said first panel;

an internally threaded transverse hole extending orthogonally through said cylindrical body;

a threaded fastener positioned through said third hole in said second panel, said second hole in said first panel, and secured in said transverse hole in said cylindrical body; and an alignment mark on said outer end of said cylindrical body aligned with said transverse hole to indicate positioning of said transverse hole relative to said threaded fastener.

* * * * *